United States Patent [19]
Bagdal

[11] Patent Number: 5,117,081
[45] Date of Patent: May 26, 1992

[54] ROLL ROUNDNESS MEASURING AND MACHINING APPARATUS AND METHOD

[75] Inventor: Karl T. Bagdal, Middletown, Ohio

[73] Assignee: Armco Inc., Middletown, Ohio

[21] Appl. No.: 678,101

[22] Filed: Apr. 1, 1991

[51] Int. Cl.$^5$ .............................................. B23H 9/04
[52] U.S. Cl. ..................................... 219/69.1; 33/550;
33/657; 33/DIG. 21; 219/69.17; 356/357
[58] Field of Search .................. 33/550, 657, DIG. 21;
356/357, 358; 219/69.13, 69.16, 69.17; 73/66,
460, 461, 462, 468; 82/903

[56] References Cited

U.S. PATENT DOCUMENTS

| | | | |
|---|---|---|---|
| 2,019,066 | 10/1935 | Balsiger | 51/165.77 |
| 2,465,002 | 3/1949 | Aller | 73/37.5 |
| 3,076,342 | 2/1963 | Hilgers | 73/462 |
| 3,122,020 | 2/1964 | Hack | 73/462 |
| 3,744,135 | 7/1973 | Gebel | 33/556 |
| 3,812,376 | 5/1974 | Takeyama et al. | 356/357 |
| 4,028,524 | 6/1977 | Moll et al. | 73/462 |
| 4,417,816 | 11/1983 | Kindl et al. | 33/DIG. 21 |
| 4,506,133 | 3/1985 | Inoue | 219/69.13 |
| 4,524,546 | 6/1985 | Hoover et al. | 51/165 R |
| 4,548,503 | 10/1985 | Liesch et al. | 356/373 |
| 4,653,196 | 3/1987 | Moschner et al. | 33/552 |
| 4,653,324 | 3/1987 | Nugier | 73/460 |
| 4,775,947 | 10/1988 | Marron | 33/550 |
| 4,916,824 | 4/1990 | Shimazutsu et al. | 33/551 |
| 4,949,468 | 9/1990 | Kohler | 33/555.1 |
| 4,958,442 | 9/1990 | Eckhardt | 33/550 |

FOREIGN PATENT DOCUMENTS 1216169  1/1987  Canada .
2123505  11/1972  Fed. Rep. of Germany ......... 73/460

OTHER PUBLICATIONS

Article entitled "Roll Eccentricity Monitoring for Strip Quality Control" by James F. Cory, Jr., et al. from Iron and Steel Engineer, Feb. 1990, pp. 24-26.
Society of Mechanical Engineers Tool and Manufacturing Engineers Handbook McGraw-Hill, Dec. 1976, 3rd Edition, pp. 34-7 and 34-8.

*Primary Examiner*—Geoffrey S. Evans
*Attorney, Agent, or Firm*—Frost & Jacobs

[57] ABSTRACT

An apparatus and method for measuring and machining the roundness and concentricity of an outer surface of a roll having oppositely disposed ends spaced along a longitudinal axis. The apparatus includes a plurality of spaced roll supports for rotatably supporting the outer surface, and one or more drive wheels to rotate the roll about its longitudinal axis. An axial strut is provided for limiting the axial movement of the roll during rotation, and a pair of locators are individually mounted adjacent each of the ends of the roll and establish a reference line along the roll. A plurality of displacement monitoring devices using lasers simultaneously measure variations in the contour of the outer surface and movement of the reference line as the roll is rotated. The apparatus is further designed to determine the true axis of rotation of the roll, whereby a profile of the roll can be obtained by comparing roundness measurements taken at any point along the longitudinal axis to the true axis of rotation. A preferred embodiment includes an electrical discharge machining device which can utilize roundness and concentricity measurements to optimize the machining of the outer surface.

22 Claims, 7 Drawing Sheets

ROLL ROUNDNESS MEASURING AND MACHINING APPARATUS AND METHOD

TECHNICAL FIELD

This invention relates to an apparatus and process for measuring and machining of back-up and work rolls such as utilized in steel rolling processes, and, more particularly, to an apparatus and process which can measure and machine the roundness and concentricity of the outer surface of relatively large rolls to an accuracy on the order of less than several ten-thousandths of an inch.

BACKGROUND ART

In steel rolling, metal forming, and similar processes, gage variations which are induced in flat rolled sheet products by eccentricity of the back-up and/or work rolls, is a widespread problem which is growing in criticality as a result of increasing demand for improved control of gage variation and strip shape. Eccentricity is defined as the sum of out-of-roundness and concentricity errors, which can be quantified by total indicator run-out from a mean axis of rotation of the roll. The gage thickness of the final formed sheet is directly dependent upon the accuracy of the gage between opposed rollers and their eccentricity about their axis of rotation. Minimizing thickness variation in the sheet products is critical to enabling the most efficient use of materials and energy to produce acceptable products.

Current roll grinding and measuring technology has several deficiencies in providing roll roundness of sufficient accuracy to permit the precise control of strip gage variation required to produce flat rolled sheet products which meet the ever increasing tolerance demands of modern industry. These deficiencies include the fact that the accuracy of grinding the working surface of a roll can be no better than the roundness of the surfaces upon which the roll is supported during grinding procedures.

Large diameter back-up and work rolls used in steel making, aluminum processing, paper handling and similar applications conventionally include a cylindrical central work surface with oppositely disposed tapered neck portions extending longitudinally from either end, and cylindrical neck portions at the distal ends of the tapered portions. Grinding is most often undertaken while supporting the roll via its cylindrical neck portions. Additionally, due to the relatively large size of these rolls (e.g., as large as 60" in diameter, 15-20' in length, and weighing 50 tons or more), the rolls are often supported by Babbit support shoes, and the interface between the support shoes and the neck portions of the rolls is supplied with grease to reduce the frictional effects of the metal-to-metal contact. Inherently, however, such metal-to-metal contact can create frictional stick/slip interruptions in smooth rotation of the roll and which can be detrimental to uniform grinding operations.

In order for a grinding wheel to abrade the outer surface of a roll, substantial radial force must be imposed between that outer surface and the grinding wheel. In addition to and in combination with vibrations imposed by the ambient environment and the frictional effects of bearing supports and the like, the grinding force often varies and may become unstable, which can lead to chatter marks and other variations in the resulting roundness of the ground roll.

In addition to a need for improved machining apparatus to provide rolls with significant roundness characteristics, apparatus and procedures for accurately measuring the roundness of a roll prior to, during, and following grinding procedures must also be provided for determining the roundness of a particular roll at any particular time. The industry has experienced problems in the past in developing satisfactory roll calipers of manageable size and reasonable cost to ascertain the surface profile of roll diameters. Such calipers have often required inordinate amounts of time and manual operation to determine such a surface profile, as exemplified in the gaging devices of U.S. Pat. Nos. 2,019,066; 2,465,002; and 3,744,135.

An improved roll profile gage is shown in U.S. Pat. No. 4,524,546 (which issued to B. Hoover and the present applicant) contemplated for use with a conventional roll grinder having a headstock and tailstock for mounting the opposite ends of the roll to be ground. While the roll profile gage of the '546 patent provides improved accuracy and convenience in this conventional set-up, both the gage and the grinding wheel must be moved longitudinally along the roll for grinding and measuring operations. In addition to the deficiencies mentioned above concerning such conventional grinding apparatus and procedures, mounting of a relatively large and heavy roll within longitudinally spaced headstock and tailstock members often allows for additional error or wobbling along the longitudinal axis of the roll to enter into the grinding process, thereby further limiting the overall accuracy and resulting eccentricity of the roll. While this profile gage is quite accurate in measuring the condition of the roll surface, it does not measure angular deviation along the longitudinal axis of the roll to correct for eccentric rotation of the roll or to determine the concentricity of the outer surface about its true axis of rotation.

U.S. Pat. No. 4,958,442, which issued to R. Eckhardt, concerns a measuring device designed specifically for measuring the diameter of rolls on roll grinders. The Eckhardt device is an example of a large caliper measuring device including a boom, rotatable arm, guide arm, and a pair of measuring probes attached to measuring support bars mounted on the cross-beam and movable in a vertical direction. Eckhardt further discusses prior art devices which required that the longitudinal axis of the roll be situated at a predetermined level, because only a single measuring arm was available for movement. Another prior art device was discussed as including two measuring arms, but still requiring that the longitudinal axes of the rolls be maintained in a known position. While the Eckhardt device allegedly provides a measuring device which allows arbitrary position of the longitudinal axis of the roll, it cannot provide an accurate reading of the roundness of the roll including a measurement of concentricity, and requires a vertical column, boom and other supporting elements which would tend to interfere with grinding or machining operations.

U.S. Pat. No. 4,916,824, which issued to H. Shimazutsu, et al., allegedly addresses the problems encountered with utilizing a parallel detector way held against the ends of a roll by locating arms, and the errors caused by deflection of the detector way in use. Like the Hoover patent discussed above, the Shimazutsu, et al. device is utilized to determine the outer profile or crown of the working surface of a roll, yet has no way of determining or monitoring the center of the rotating roll to determine true roundness and concentricity. While Shimazutsu et al. recognize the inherent errors inherently imposed by deflections of longitudinal ways, and attempt to address such problems, they do not provide an apparatus or method for measuring and machining roll roundness as required by more demanding product tolerances.

Another roll measuring device is shown in U.S. Pat. No. 4,949,468, which issued to P. Kohler. The Kohler device is specifically designated for measuring the diameter of a rotationally symmetric body, and utilizes a measuring jaw that wraps around the peripheral surface and features a pair of arms with a stylus on the free ends of those arms. The Kohler device similarly requires a longitudinal way, relies upon the rotational symmetry of the roll to be measured, and is directed merely to obtaining a measurement of the diameter of the roll. While diameter accuracy is certainly important in large rolls such as used in steel mills, paper mills, and the like, a measurement of diameter does not provide the data required to determine the roundness and concentricity of the roll.

Roundness of a roll has also often been determined by comparison with a master round having a cross-section comparable to that of the roll and located physically close enough for direct comparison by utilizing a pair of closely adjacent probes. The problem with such set-ups is that it is often difficult to locate the master round closely adjacent to the portion of a roll to be measured, as well as requiring a specific size master round for each part size. Another problem with this procedure is that it does not measure the angular motion of the axis of rotation of the roll.

Another method utilized to measure out-of-roundness is known as the bench-center method. Particularly, the part to be measured is mounted on a mandrel with center holes for rotation on the bench, whereby accurate measurements are made of the outer surface. Problems with this method are that the part must have center holes or be adaptable to mounting on a mandrel with center holes. Such mounting is obviously cumbersome in cases of very large and heavy rolls. Additionally, measurement accuracy is effected by the shape and angle of the centers and center holes, location and alignment of the centers and the center holes, lubrication of the center, and straightness of the part surface itself. Moreover, these variable factors must be controlled to a greater degree than the roundness accuracy desired.

Consequently, while requirements for closer tolerances and finished product gages have become much more demanding, processes and devices for machining and measuring the rolls used to produce these materials has not kept pace. Heretofore, there has not been available an apparatus or method for precisely machining and measuring roll roundness on the outer surface of relatively large rolls, wherein accurate and repeatable measuring and precise machining can be accomplished in an efficient and timely manner. Prior grinding and measuring techniques are limited in accuracy and uniformity and are unable to provide roll roundness accuracies sufficient to meet these increasing requirements.

DISCLOSURE OF THE INVENTION

It is an object of this invention to obviate the above-described problems and shortcomings of prior measuring and machining apparatuses and processes heretofore available in the industry.

It is another object of the present invention to provide an improved apparatus and method for measuring and machining roll roundness with significantly improved efficiency and accuracy.

It is yet another object of the present invention to provide a method and apparatus for measuring and machining rolls to a roundness on the order of less than several ten thousandths of an inch accuracy in an efficient and repeatable arrangement.

It is also an object of the present invention to provide a roll measuring and machining apparatus and method which is capable of machining even the hardest and strongest alloys without chatter marks and with excellent control of surface finish.

It is another object of the present invention to provide a method and apparatus which can precisely measure and machine the outer surface of a roll with roundness on an order of less than several ten thousandths of an inch of perfection in a quiet and dynamically stable environment.

In accordance with one aspect of the present invention, there is provided an apparatus for measuring the roundness and concentricity of an outer surface of a roll having oppositely disposed ends spaced along a longitudinal axis. The apparatus includes a plurality of spaced roll supports for rotatably supporting the outer surface, and, in a preferred embodiment, one or more drive wheels which frictionally engage the roll in order to rotate it about its longitudinal axis. An axial strut may be provided for limiting the axial movement of the roll during rotation, and a pair of locators are individually mounted adjacent each of the oppositely disposed ends of the roll. The locators establish a reference line along the roll. A plurality of displacement monitoring devices for simultaneously measuring variations in the contour of the outer surface and movement of the reference line as the roll is rotated are provided as part of an arrangement for measuring the roundness of the outer surface. The apparatus is further equipped for determining the true axis of rotation of the roll, whereby a profile of the roll can be obtained by comparing roundness measurements taken at any point along the longitudinal axis to the true axis of rotation.

The roundness measuring apparatus further comprises a means for measuring displacement of the roll about its outer surface as well as movement of the reference line during rotation of the roll. Feedback from the roundness measurement operation can be provided in order to monitor the changing roundness and concentricity of the outer surface as it is machined. A preferred embodiment includes an electrical discharge machining device which can utilize the roundness and concentricity measurements to optimize the machining of the outer surface.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
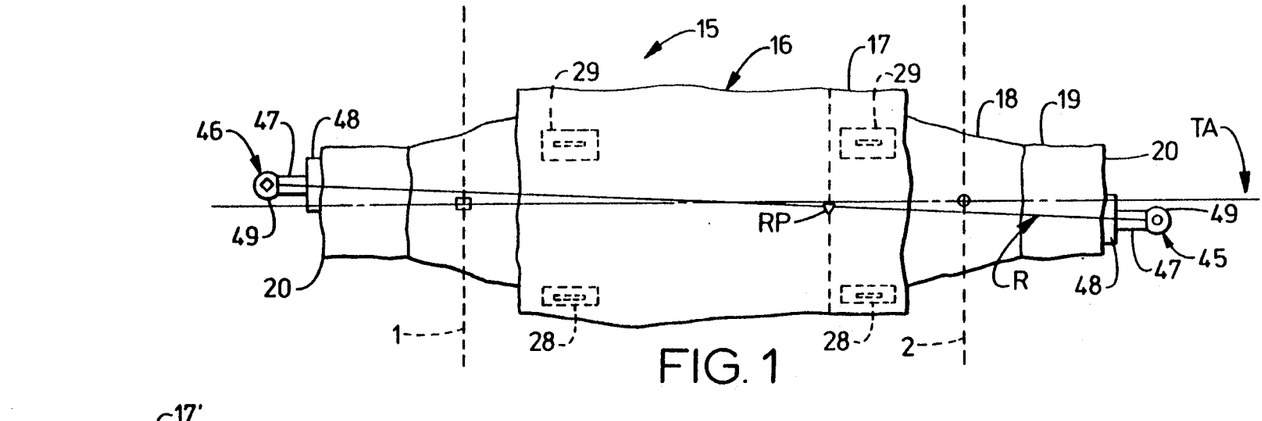
FIG. 1 is an exaggerated schematic view of an exemplary roll to be measured for roundness and concentricity and machined in accordance with the present invention.

Referring now to the drawings in detail, wherein like numerals indicate corresponding elements throughout the views, FIG. 1 illustrates, in an exaggerated manner, an elevation view of a roll 15 who's roundness and concentricity is to be measured and/or machined. As used herein, the term "roll" will be understood as including any of a wide variety of work rolls, back-up rolls, feed rolls, pressure rolls, or the like, used in the variety of industrial applications such as steel, aluminum, and paper handling and processing, and similar applications. Generally, such rolls featured relatively large diameters (e.g., 12-80 inches, or 30-200 cm) and can weigh more than 50 tons (45 tonnes), although the apparatus and method of the present invention has utility for measuring and machining rolls of virtually any size. As mentioned above, eccentricity of such rolls will be understood to mean the combination of the out-of-roundness and concentricity errors or total indicator run-out from mean axis of rotation of the roll.

Roll 15 is shown as including an outer surface 16 defined by a working surface 17, oppositely disposed conical necks 18, and distally opposed cylindrical necks or outer necks 19. A pair of locators 45 and 46 are shown as being individually mounted adjacent the oppositely disposed vertical end walls 20. Each of the locators 45 and 46 preferably comprises a very accurate sphere (e.g. 49) which has been tested for roundness (or sphericity) by an independent calibrating device, and an attachment plate 48 and extension shaft 47. A reference line R is illustrated as extending longitudinally along roll 15 between the centers of the oppositely disposed spheres 49. As will be discussed in greater detail below, roll 15 will preferably be rotatably supported by a plurality of spaced roll supports, such as the spaced sets of supports 28 and 29, respectively, shown in phantom beneath roll 15.

Figure 2:
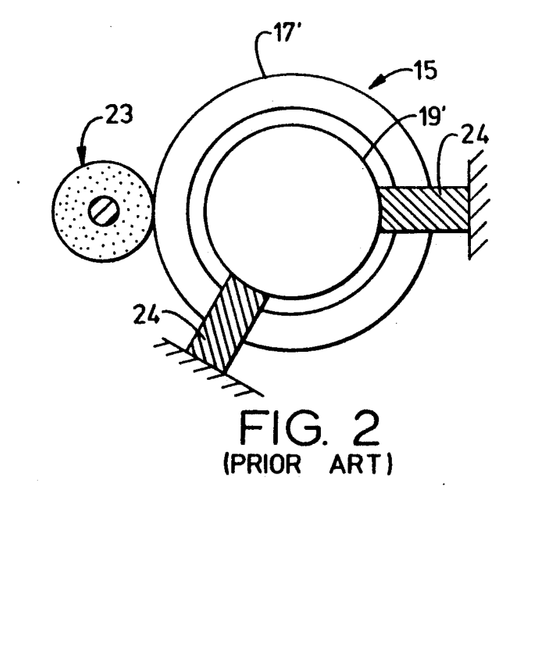
FIG. 2 is a schematic end view of a prior art roll grinding arrangement.

FIG. 2 shows a schematic end view of a roll 15' with its cylindrical neck 19' resting upon two supports 24 located at about the 3 and 7 o'clock positions. At the 9 o'clock position is a machining device (e.g., grinding wheel or grinder 23) being advanced to the right and against the roll as roll 15' is rotated on supports 24 (e.g., Babbit shoe supports). Shoe supports 24 contact and support roll 15' about the outer periphery of cylindrical neck portion 19', usually with lubrication such as grease between the metal-to-metal contact. One particular problem with this common roll grinding setup is that the final ground roundness of the roll surface is ultimately limited by the roundness of the cylindrical neck 19' upon which the rotating roll is supported.

While there is known in the industry a grinding technique known as a "centerless" machining process, wherein non-round rolls become rounder as the roll rotates and the high spots are machined away by grinder 23, the centerless process requires that an object be supported for rotation on the very surface being ground. This process is generally not used for machining large rolls. Instead, machining devices having large headstocks and tailstocks are often used to accomodate large rolls, requiring precise location of the roll's center for support. As mentioned above, such arrangements often allow additional errors and wobbling to limit overall accuracies attainable.

Figure 3:
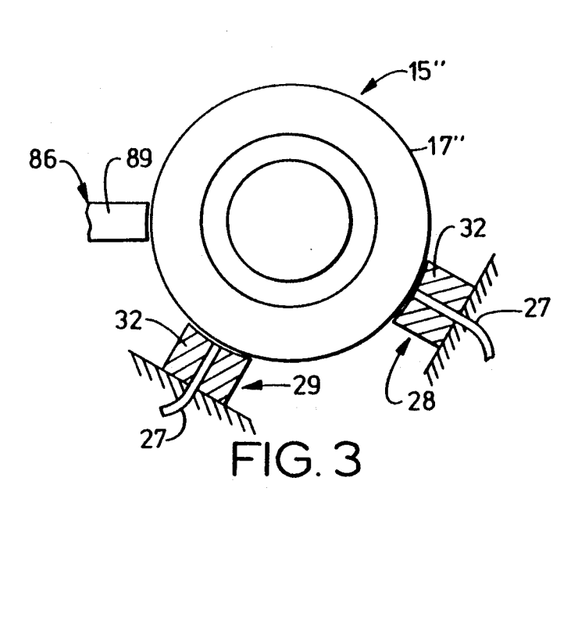
FIG. 3 is a schematic end view of a preferred centerless support set-up of the present invention, illustrating hydrostatic bearing supports and an electrical discharge machining device.

FIG. 3 illustrates a schematic view similar to that shown in FIG. 2, but illustrating a preferred arrangement of the present invention in which a roll (e.g., 15") may be supported by a pair of spaced and substantially frictionless supports 28 and 29. Particularly, supports 28 and 29 are shown in FIG. 3 as comprising hydrostatic bearings 32 designed to support roll 15" about its outer surface on a thin film of oil supplied to supports 28 and 29 by lines 27. This substantially frictionless support of roll 15" minimizes the metal-to-metal contact and the vibrations and stick/slip problems often encountered with the greased shoe support arrangement.

Additionally, supporting roll 15" on the same outer or working surface (e.g., 17") to be machined enables the employment of a centerless machining principal for improving roundness, whereby the final roundness of the surface is not limited by the original roundness of the supporting roll surface. FIG. 3 further illustrates a machining means 86 which is preferably an electrical discharge machining device which enables controlled removal of roll material without requiring the very high grinding wheel-to-roll forces applied in grinding procedures, and minimizing the potential for chatter marks to develop.

Figure 4A:
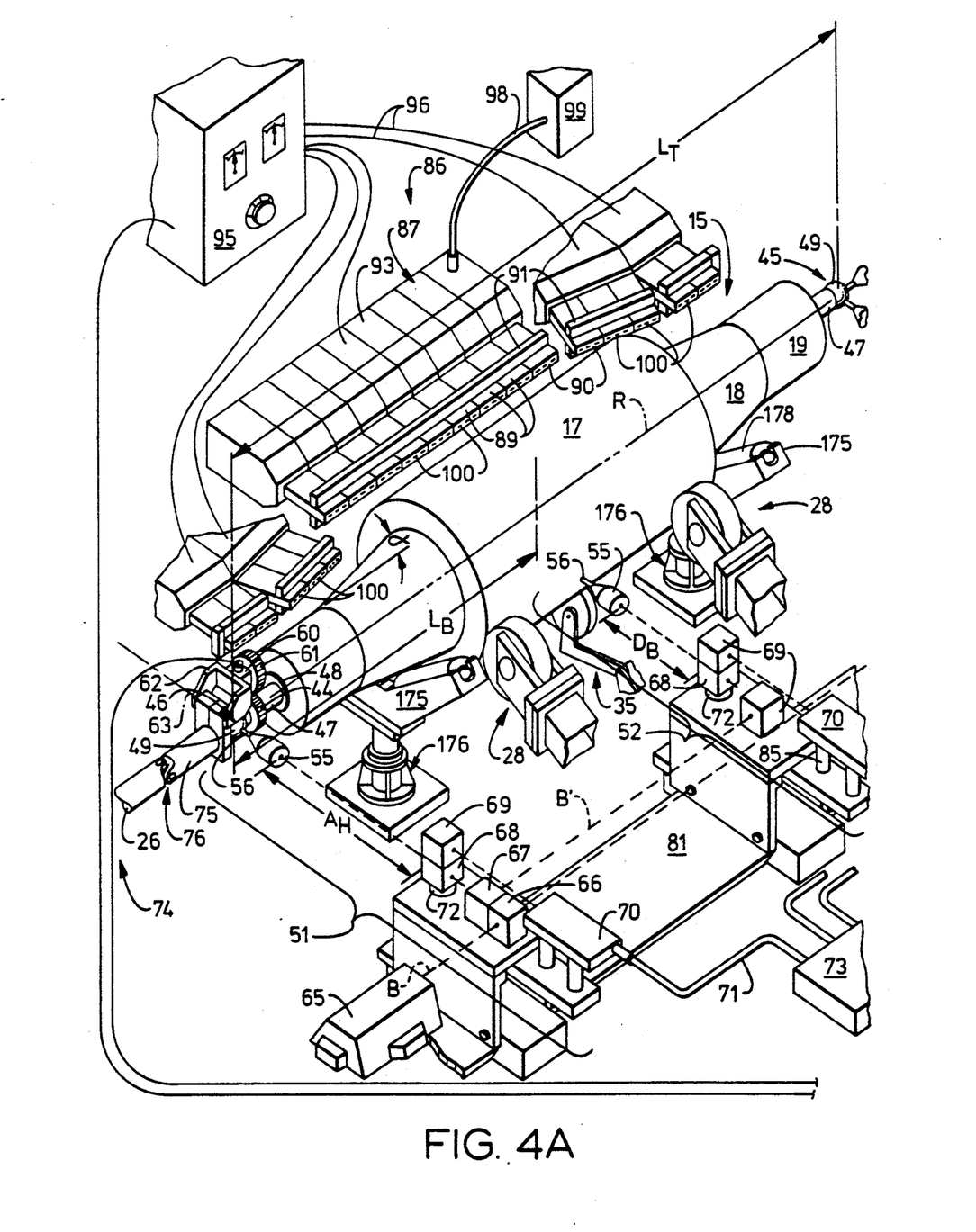
FIGS. 4A and 4B comprise a single, split schematic view of a roll roundness measuring and machining apparatus made in accordance with the present invention.
Figure 4B:
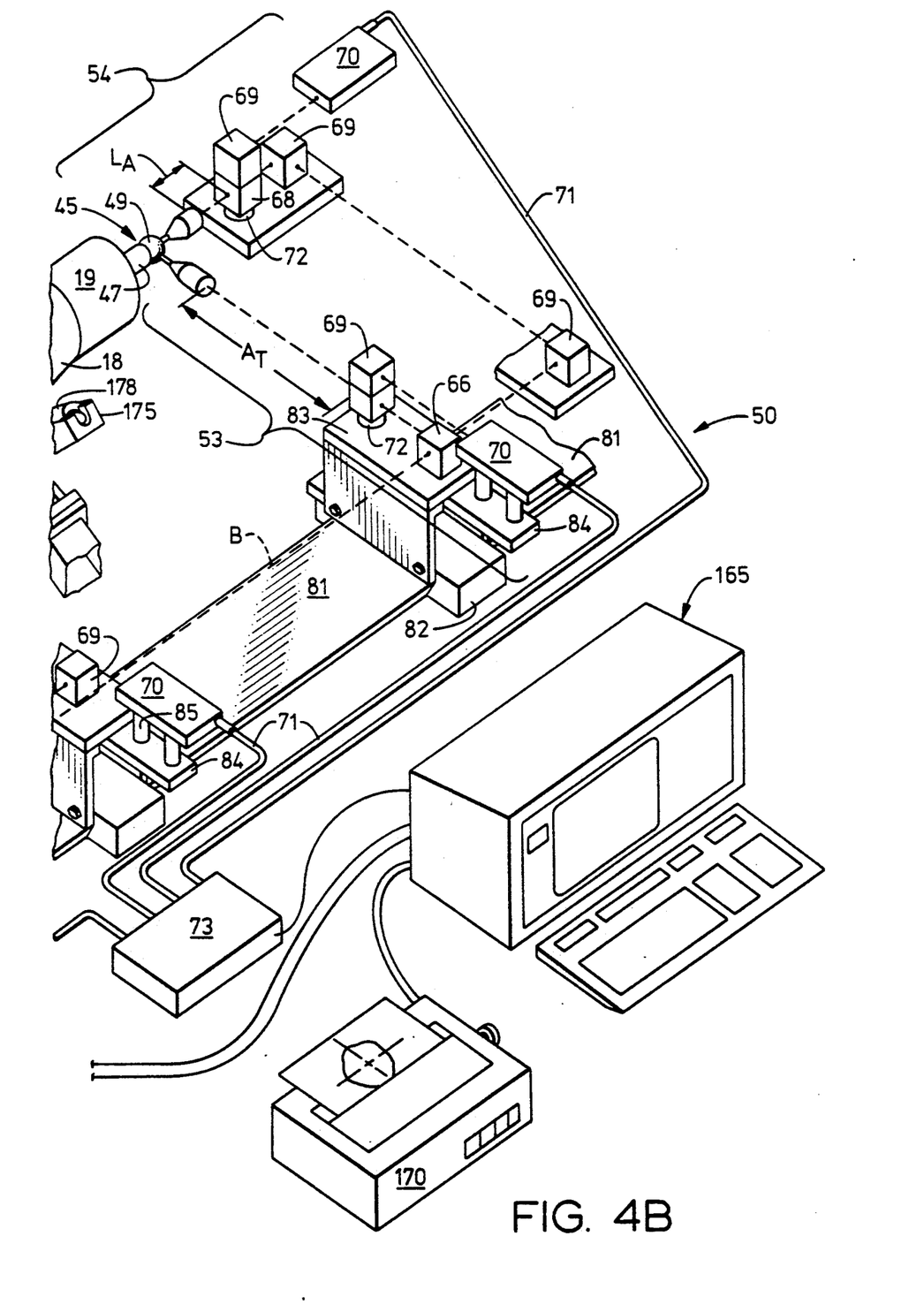
Figure 5:
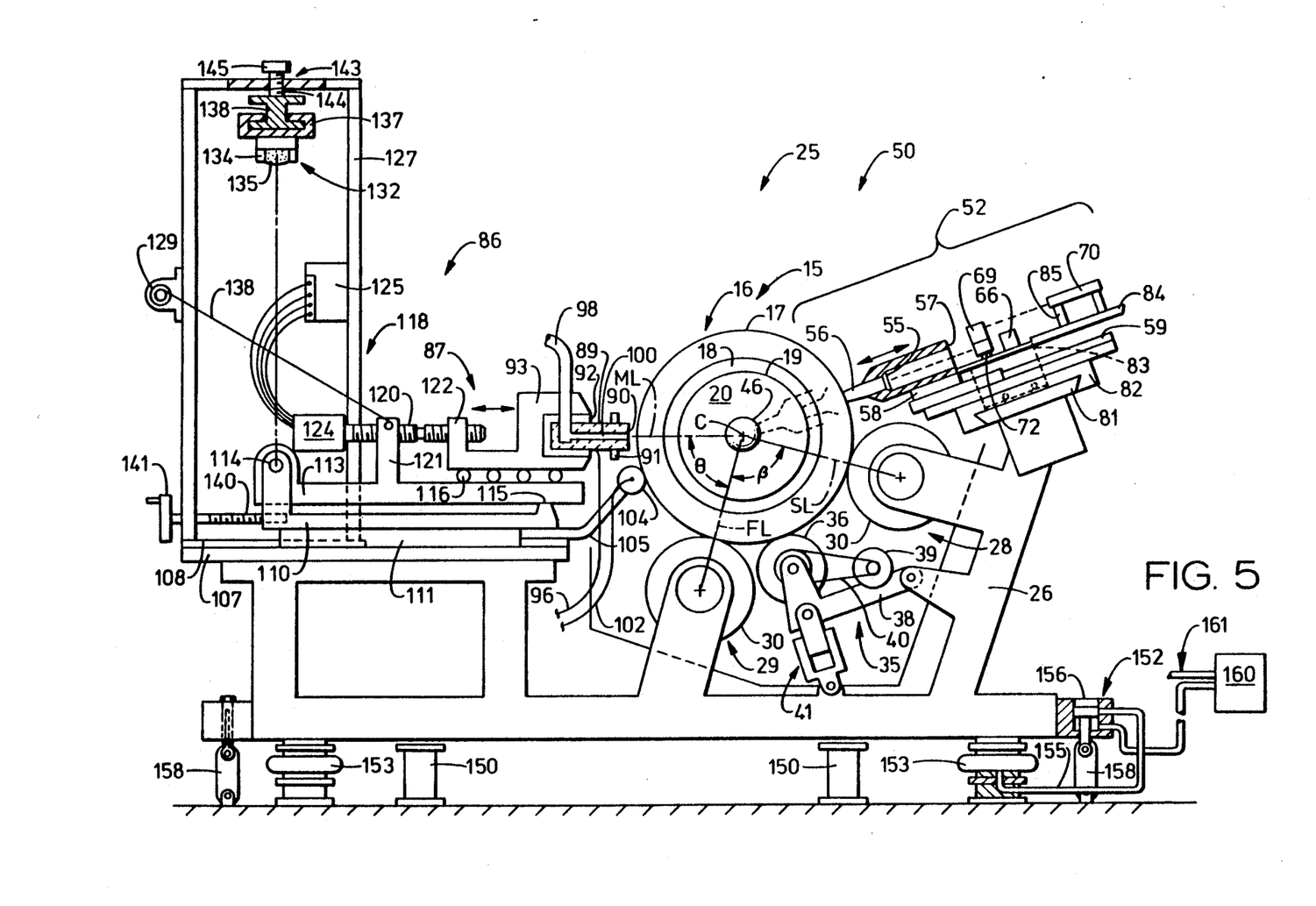
FIG. 5 is a schematic end view of a portion of a measuring and machining apparatus made in accordance with the present invention and generally corresponding to the schematic illustration of FIG. 4.

FIGS. 4A and 4B, and 5-6 illustrate various structural aspects of the apparatus 25 of the present invention for roll roundness measuring and machining an exemplary roll 15. Particularly, FIG. 5 illustrates an apparatus 25 for roll roundness measuring and machining which comprises a main frame 26 which can most preferably be provided in the form of a rectangular tube frame formed of steel members for providing maximum rigidity. Frame 26 can further be provided with a hollow interior which may be filled by a vibratory deadening material, such as dry sand, such deadening material acts as an energy absorbing and dissipating medium to dampen external vibratory influences. The machine frame can further be isolated from ambient vibrations via a series of low pressure air bags (e.g., 153) for vertically and horizontally "suspending" frame 26 in effective isolation from the surrounding environment.

An air pressurizing system 152 is illustrated as including a plurality of air bags 153 (e.g., Firestone Airmount air bags available from the Firestone Corporation, Akron, Ohio) supplied by air pressure lines 155 and pressure control devices such as regulator or height control valve 156, which can be adjusted by regulator adjusting turnbuckle 158. Air pressure is supplied from a pressure source (e.g., 160) via supply lines 161. While not illustrated, it is contemplated that one or more horizontally disposed air bags would similarly be situated between frame 26 and a suitable anchoring device for preventing horizontal movement of frame 26 in use. When the low pressure air bag system is not activated, frame 26 will rest upon a plurality of frame rests 150.

Two sets of opposed, spaced roll supports 28 and 29 are provided to rotatably support roll 15 on an outer surface 16 (e.g., working surface 17) which is to be machined in a centerless arrangement, as discussed above. It should be noted that while roll 15 is shown in FIGS. 4 (A and B) and 5 as being rotably supported on working surface 17, it could also be supported via its tapered necks 18 or conical necks 19 if desired. For example, FIG. 11, described below, illustrates a roll 215 supported on its conical necks 219. It is only critical that the roll be supported by the surface which is being machined, in order that the centerless rounding process can be employed.

As shown in FIG. 5, upper or second support 28 is disposed at a predetermined angle $\beta$ as measured between second support line SL and first support line FL intersecting at the approximate center (C) of roll 15. Similarly, first or lower roll support 29 is situated at a predetermined angle $\Theta$ (e.g., approximately 75°) from the machining line ML along which roll 15 will be machined, as further described below. While these two angles can vary, optimum angles for achieving roundness in the most efficient manner for all conditions can be determined in accordance with centerless machining procedures well known in the industry. Computer simulation of the machining conditions as contemplated in apparatus 25 indicate that angles of $\Theta$ equaling 75° and $\beta$ equaling 90° are good choices.

While it is preferred that roll 15 be supported for rotation within apparatus 25 by hydrostatic bearings as discussed above, it is also contemplated that highly accurate roundness measurements and machining can be accomplished with the present apparatus and process if precise, low friction support rolls are utilized for roll supports 28 and 29, as illustrated. As any run-out of these rolls would correspondingly limit the total performance of the system when machining a roll, very careful attention must be given to the manufacture of these rolls to assure that they are as perfectly round as possible.

As an example, rolls 30 might be made of air-hardened tool steel and mounted on an axle with Class 7 precision roller bearings, with the surface of the rolls being ground in fully assembled configuration to assure minimum run-out. A slight crown (e.g., 0.010 inches, or 0.25 mm) may be preferred on the diameter of each roll to facilitate alignment of the rolls in machine frame 26, to guarantee uniform loading of the ball bearings, and to prevent marking of roll 15 by heavy contact with an edge of a roll support. As also indicated, it may be preferred to provide roll support 29 with a slightly larger diameter than roll support 28, as its support position will inherently cause it to bear more of the supporting load in this arrangement.

Drive means 35 for rotating roll 15 about its longitudinal axis is preferably provided in the form of one or more drive wheels 36 for frictionally contacting roll 15 to impose rotational energy. Drive means 35 is further illustrated as including means 39 for providing rotational energy (e.g., a drive motor), with a drive belt or chain 40 transmitting such rotational energy to the drive wheels. A movable frame 38 may also be included to move wheel 36 into or out of frictional contact with roll 15, such as via a biasing means 41 which may comprise a hydraulic cylinder or the like. It is also preferred that the outer surface of drive wheel 36 include a friction surface such as soft polymer or the like to enhance the frictional interaction with roll 15 and to make the transfer of rotational energy more efficient.

As discussed above, the process of the present invention contemplates the mounting of locators 45 and 46 adjacent each of the oppositely disposed ends 20 of roll 15, with those locators including a pair of spheres 49 of known roundness. It is also preferred that one of the locator shafts 47 include a gear 44 attached about its periphery to drive a rotary encoder or pulse generator 60 which will be utilized to accurately monitor the rotary position of roll 15 as it is rotated within device 25. As seen best in FIGS. 4A and 4B, pulse generator 60 is engaged with roll 15 via the interaction of gear 44 and gear 61. Such a pulse generator can output a number of pulses (e.g., 1200) per revolution of roll 15, and is shown with a flip-up support 62 which enables disengagement of rotary encoder 60 by rotation of support 62 about rotation axis 63. Disengagement of pulse generator 60 to a rotated position is preferred for enabling the insertion and removal of roll 15 from apparatus 25 without interference.

Figure 6:
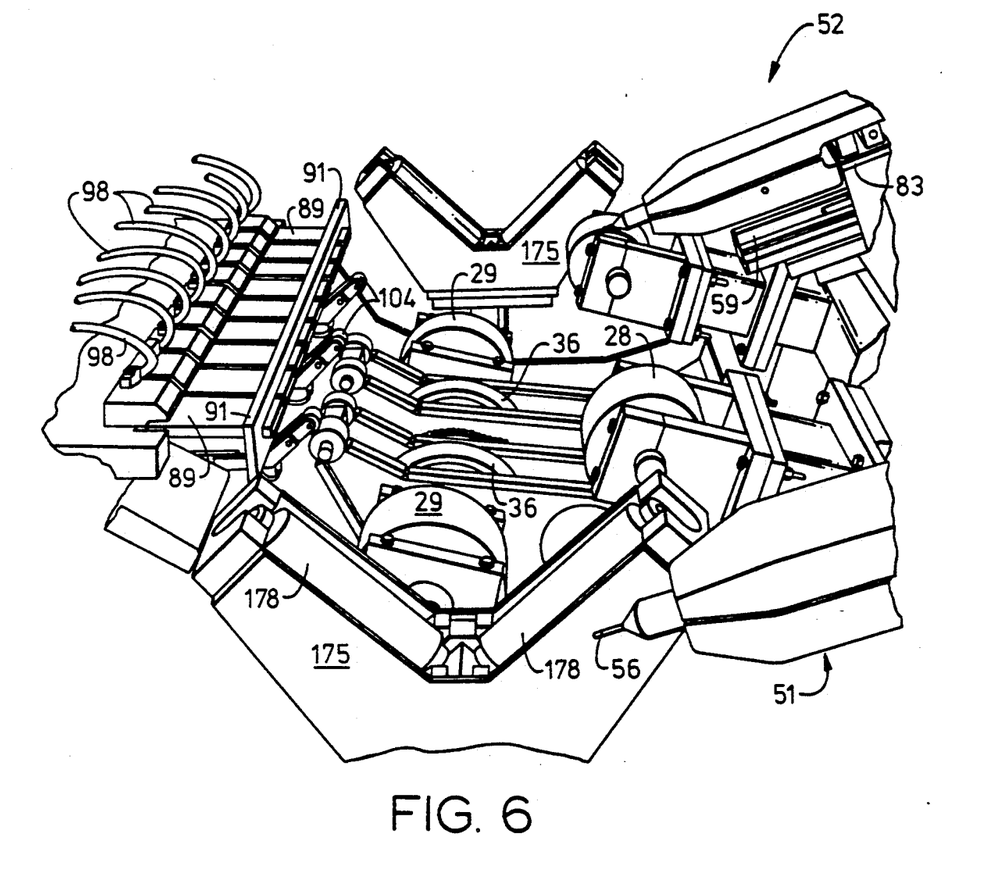
FIG. 6 is a partial perspective view of a roll roundness measuring and machining apparatus of the present invention.

As best seen in FIGS. 4 and 6, a pair of spaced Y-shaped yokes or roll receivers 175 are provided to receive a roll 15 for insertion into apparatus 25, and include lifting means (e.g., hydraulic cylinders) 176 for slowly lowering/raising roll 15 into and out of apparatus 25. Yokes 175 are further illustrated as including a pair of inwardly facing angled hard rubber rollers 178 designed to gently receive roll 15 via an outer surface (e.g., conical neck 18) whereby roll 15 can be slowly lowered onto support rolls 28 and 29, or slowly lifted upwardly from such roll supports. As indicated in FIG. 4, during measuring or machining processes, yokes 175 are lowered out of contacting proximity of roll 15.

Means 50 for measuring the roundness and concentricity of a roll 15 is illustrated as including a plurality of means (e.g., 51–54) for monitoring displacement of roll 15 as it is rotated. Means 50 is shown and described herein as a laser interferometer system for simultaneously monitoring four axes of displacement through monitoring means 51–54, and such devices can be obtained in the industry such as from Hewlett-Packard, of Palo Alto, Calif. Because each of the displacement monitoring means 51–54 comprises essentially identical structure, the details will be discussed with reference to a single unit (e.g., 51). Specifically, as seen in FIGS. 4 and 5, each displacement monitoring means includes a retro-reflecting cube 55 attached to a movable probe 56 designed to contact a surface to be monitored.

The assembly of retro-reflecting cube 55 and probe 56 is preferably spring loaded with housing 57 against a surface (e.g., working surface 17) to be monitored in order to eliminate potential backlash. Probe 56 preferably comprises a wear resistant material such as tungsten carbide, and the spring loaded nature of the cube/probe assembly can be provided by mounting such assembly via a spring or similar biasing means 64 (see FIG. 10), to a mounting slide 58. Probe 56 will be oriented such that it is substantially normal to the surface to be monitored.

Housing 57 is itself preferably slidably movable in a direction normal to the surface to be monitored, such as by slide 58 mounted upon way 59. Slideway 59 surmounts and is attached to longitudinal slide 82, which is preferably moveable in a direction parallel to the longitudinal axis of roll 15 in use along longitudinal dove-tail way 81. While housing 57 is moveable transversely to slide 82 on slide 58, a portion of the displacement monitoring means is to remain stationary relative to slide 82 in order to receive a laser beam B from laser source 65. Such stationary support is provided by a U-shaped flange 83 which is attached at its lower edges to slide 82. Extending rearwardly from the upper portions of flange 83 is a cantilevered support tab 84 which provides a stationary mount for beam receiver/resolver 70. A pair of posts 85 are illustrated as extending upwardly from tab 84 to position receiver 70 appropriately to receive reflected laser beams from the aligned reflector cube 69.

A laser beam B is provided by source 65 in a direction substantially parallel to the longitudinal axis of a roll 15 to be measured and machined within apparatus 25. Beam B may itself comprise light at several distinct wavelengths (e.g., $f_1$ and $f_2$). As illustrated in FIGS. 4A and 4B, beam B passes through an initial beam splitter 66, and a portion of that beam is split and directed inwardly 90° into a second beam splitter 67. Second beam splitter 67, in turn, splits that inwardly directed beam into two portions. One portion continues inwardly into displacement monitoring means 51, while the other portion of the beam is reflected 90° along a path parallel to original beam B. This parallel beam (B') is directed to a subsequent reflector 69 which directs that beam inwardly 90° into displacement monitoring means 52.

The portion of original laser beam B which is not split and directed inwardly at first beam splitter 66 continues along its original longitudinal path for subsequent receipt by beam splitter 66 associated with displacement monitoring means 53. Beam splitter 66 directs a portion of the beam inwardly 90° into displacement monitoring means 53, while the remaining portion of beam B continues on to reflector 69, and on to another beam reflector 69 associated with displacement monitoring means 54. In this way, each of the displacement monitoring means 51-54 is provided with a displacement monitoring laser beam.

Figure 10:
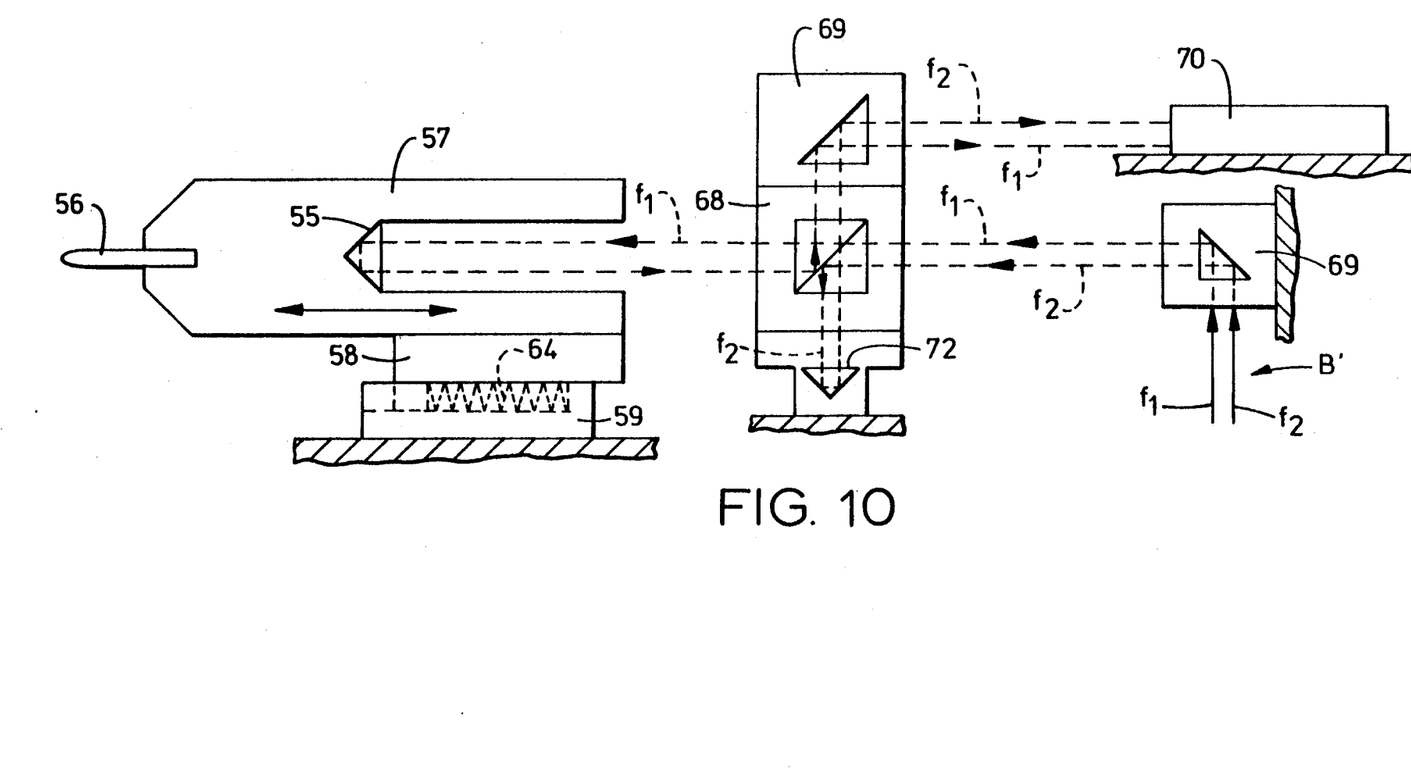
FIG. 10 is a schematic illustration of a portion of an exemplary displacement monitoring means of the subject measuring and machining apparatus.

Once the laser beam is supplied to any of the four displacement monitoring means (51-54), the beam is utilized to precisely monitor displacement variations of a surface contacted by probe 56 of that particular monitoring means. Taking monitoring means 52 as an example again, beam B' is provided to monitoring means 52 via reflector 69 where it is directed inwardly toward beam splitter 68. FIG. 10 illustrates an enlarged schematic view of the two wavelengths ($f_1$ and $f_2$) of beam B', as they are received and utilized to monitor displacement variations at probe 56.

Beam splitter 68 receives the beam and directs a portion of that incoming beam (e.g., that portion at a given wavelength $f_2$) downwardly onto a retro-reflecting mirror 72, where it is reflected upwardly into upper reflector 69, while allowing a second portion of the beam (e.g., that portion at the wavelength $f_1$) to pass through toward retro-reflector 55. The Portion $f_2$ of the incoming beam is reflected downwardly and then upwardly to upper reflector 69, and then directed back toward receiver 70, wherein it is received and provides a constant base signal against which the variable signal which will be reflected from retro-reflector 55 can be compared.

As will be understood, the portion $f_1$ of the beam passing through beam splitter 68 within a monitoring means will impinge upon retro-reflector 55, whereupon it will be reflected 180° back toward beam splitter 68. Beam splitter 68 includes a reflector which directs radiation reflected from retro-reflector 55 upwardly to upper reflector 69 whereupon it is recombined with the first portion of the beam and directed to receiver 70. Receiver 70 compares the received reflected signal from retro-reflector 55 with the constant base signal to measure an increase or decrease in the path link, indicating hills and valleys on the monitored surface (e.g., the working surface 17 of roll 15) as roll 15 is rotated on apparatus 25. The other displacement monitoring means (e.g., 51, 53 and 54) operate in a substantially identical manner to monitor variations in other surfaces being monitored.

It is contemplated that during one revolution of roll 15, a large number of readings (e.g., 1200) are recorded from each axis of the laser interferometer system, as designated by pulse generator 60. To compute a polar plot of any particular surface being monitored during any particular revolution, a computer (e.g., 165) can be linked to the central controller 73 of the laser interferometer system for utilizing the data obtained from the 1200 readings. For example, 60 points might be plotted around roll 15 as it is rotated, with each of the 60 points representing an average of 20 contiguous data readings. By averaging a number of adjoining data points in this way, a partial filtering out of surface roughness influences can be accomplished on data received.

It should also be noted that means 74 for limiting the axial movement of roll 15 during rotation is preferably provided by an axial strut 75 which can be anchored to frame 26 at its proximal end. Strut 75 further preferably includes a universal joint or connection 76 to accommodate initial wobbling or eccentric movement of roll 15 during rotation, and includes a distal end which may include a plurality of roller bearings (not shown) to interface with the spherical member 49 in a substantially frictionless manner. Strut 75 insures that movement of roll 15 along its longitudinal axis is ultimately limited in a direction toward strut 75.

In order to obviate a need to provide a second strut at the opposite end of roll 15, it is preferred that one or more of the roll supports 28 and 29 be canted slightly in a direction which will tend to "screw" roll 15 toward axial strut 75 during rotation. It should be understood that any means for tending to direct any axial movement of roll 15 toward strut 75 could equally be substituted, such as tilting the machine frame so that gravity tends to maintain roll 15 against axial strut 75.

As also indicated in FIGS. 4A, 5 and 6, an electrical discharge machining apparatus (EDM apparatus) is preferably provided as the machining means 86 for improving the roundness and concentricity of roll 15 within apparatus 25. As illustrated, machining means 86 may comprise a roll machining device 87, which could be any kind of grinding wheel or machining device. In a preferred embodiment, roll machining device 87 would comprise an EDM device including one or more EDM electrodes 89 each having a cutting face 90 oriented toward roll 15 for machining operations.

Electrodes 89 are mounted in electrode frame 93 and electrically isolated therefrom by insulator material 92. To supply EDM fluid to the spark-gap between cutting face 90 and roll 15, grooves and supply channels (e.g., 100) are milled into each electrode and supplied by supply line 98 from a source/filter/pump arrangement (e.g., 99). The completed path for the spark energy is made by a circuit wire 102 preferably attached to a contact roller 104 which can be biased against roll 15 in use, such as by a spring-loaded extension arm 105. EDM sparking power may be supplied via power supply lines 96 from an EDM power supply 95 such as available from Cincinnati Milacron, of Cincinnati, Ohio.

To insure that electrode 89 undertakes its spark erosion of a roll 15 in a safe manner (e.g., when a hyrdrocarbon fluid such as mineral oil is used as the EDM fluid), an oil dam 91 substantially encircling each electrode 89 on its upper and lower surfaces is provided to retain a sufficient volume of EDM oil closely adjacent cutting face 90 such that electrode 89 is effectively submerged in oil to prevent igniting hydrogen gas produced from the EDM process.

As best illustrated in FIG. 5, roll machining device 87 is preferably mounted on a coarse slide or guide 111 slidably supported on slideway 108 which can surmount machining table 107. Machining frame 110, in turn, surmounts guide 111 and is adjustably displaceable along slide way 108 by coarse slide adjustment screw 140 and crank wheel 141. There are preferably two slides 111 spaced along the longitudinal length of machining table 107 to provide a stable mounting arrangement for roll machining device 87, which may include a plurality of EDM electrodes placed closely adjacent one another along the longitudinal length of outer surfaces of roll 15 to be machined.

Hingedly attached to frame 110 is a second or upper frame 113 supported by a pivot joint 114 and seat 115. Pivot joint 114 provides a rotation axis about which upper frame 113 may be rotated in order to bring the EDM electrodes 89 into registration with a dressing apparatus 132 supported by a dress frame or canopy 127. Upper frame 113 further includes an upstanding bearing block 121 which supports a differential screw 120 and a stepper motor 124 for enabling fine adjustment and controlled displacement of the machining device 87 inwardly toward roll 15 as machining progresses.

To position cutting face 90 of electrode 89 adjacent the outer surface 16 of roll 15 in preparation for machining, the slides 111 of frame 110 are moved inwardly such as via handcranks 141. When a gap of approximately 0.003 inches (0.076 mm) is achieved by such coarse adjustment, the EDM oil supply pump 99 is activated, followed by activation of the roll rotation system (i.e., activation of drive wheel 36), followed by activation of the EDM power supply 95. Stepper motor 124 is thereafter activated to reduce the gap between electrodes 89 and outer surface 16 to be machined sufficiently for spark erosion to begin (e.g., approximately 0.001 inches, or 0.025 mm). During machining, electrodes 89 are moved toward roll 15 by movement of electrode frame 93 via differential screw 120. A low friction guide or bearing 116 can be provided to minimize frictional resistance to movement of frame 93. Controls 125 for stepper motor 124 can also preferably be tied into master controller 165 for automation and optimization of the machining process as roll roundness and concentricity data is provided by means 50.

As EDM spark erosion of roll 15 progresses, electrodes 89 are also consumed, and their cutting faces 90 should be dressed and/or trued from time to time to maintain good roll geometry (e.g., in order to insure uniform and controlled erosion procedures) and optimize their effectiveness. As mentioned, upper frame 113 is preferably provided with a longitudinal pivot joint 114 to allow rotation of frame 113 about an axis substantially parallel to the roll axis. FIG. 5 illustrates a dress canopy 127 which supports a crank 129 attached to a cable 138 which can be utilized to rotate frame 113 about pivot joint 114. Rotation of frame 113 enables roll machining device 86 to be articulated in an upward direction such that cutting faces 90 of electrodes 89 can be situated in a substantially vertical orientation below a dress means 132.

As shown in FIG. 5, a preferred dress means 132 can comprise a sanding block 134 supported for longitudinal movement along a slideway 138. Particularly, slide 137 supports sanding block 134 and its dressing surface 135 for movement along slideway 138 formed as the lower portion of an I-beam supported by canopy 127. Dress means 132 is also vertically adjustable via a plurality of vertically adjustable screws 144 connected to rotatable adjustment wheels 145 located above the upper cross member of canopy 127. This adjustment system can provide relatively accurate vertical adjustment of dressing surface 135 to precisely dress and/or true cutting faces 90 of electrodes 89.

Figure 7:
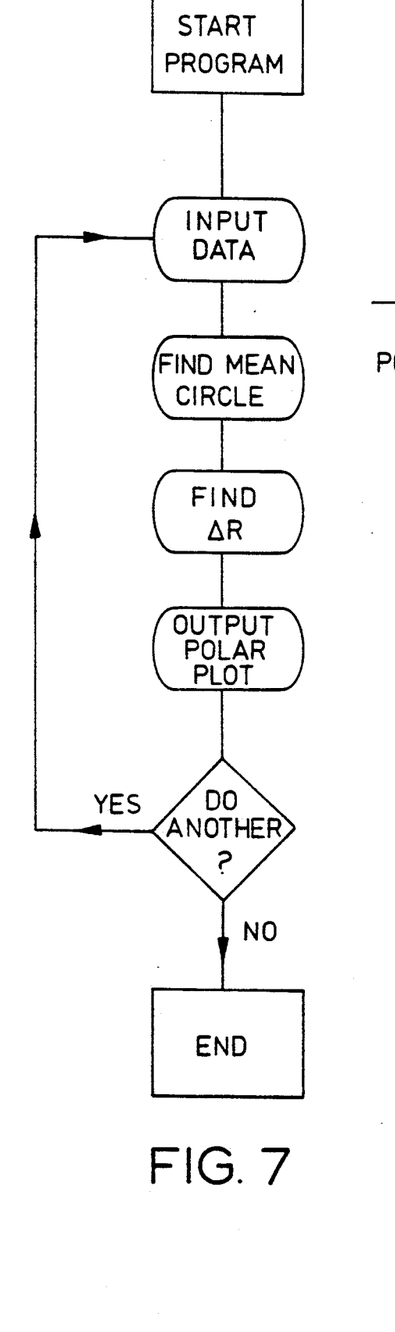
FIG. 7 is a flow chart illustrating a portion of the process of the present invention for determining roundness and concentricity of a roll.
Figure 11:
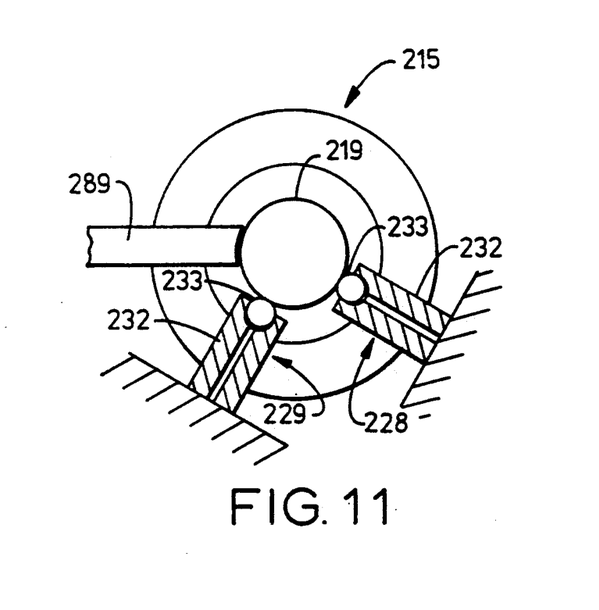
FIG. 11 is a schematic view of an alternative centerless support set-up of the present invention, illustrating roller-type hydrostatic bearing supports.

FIG. 7 illustrates a flow chart of the general process for accurately measuring the roundness and concentricity of a roll in accordance with the present invention. Once locators 45 and 46 and their precise spheres 49 of known radius are mounted on opposite ends of a roll 15 to be measured and/or machined, roll 15 is rotatably supported in apparatus 25 on the outer surface 16 to be machined. The outer surface 16 to be machined can be the working surface 17 (as illustrated in FIGS. 3, 4A and 5), the cylindrical neck portion 19 (as illustrated in FIG. 11), and/or the tapered portions 18. As will be understood, all outer surfaces of a roll 15 might also be simultaneously machined on apparatus 25 to insure concentricity of all those surfaces. FIG. 4A illustrates machining means 86 aligned along all of these surfaces, and could accomplish such simultaneous machining.

The axial movement of roll 15 along its longitudinal axis during rotation on roll supports 28 and 29 is limited, such as by axial strut 75. Once properly supported in apparatus 25, the roundness of outer surface 16 is measured as roll 15 is rotated on the roll supports, whereby means 50 for measuring roundness is utilized to simultaneously measure displacement of predetermined surfaces along four separate axes. First, however, an imaginary straight line is determined by precisely locating the respective centers of spheres 49. The imaginary straight line joining the centers of these spheres is determined as reference line R. This line is the initial reference for establishing a measurement origin. It is not important that the spheres 49 be mounted precisely on the true axis of roll 15, but it is critical that the spheres maintain their position relative to the roll's mass during the data gathering process.

Once reference line R is established, the storage registers for the axes along each of the four displacement monitoring means 51-54 are set to zero in central controller 73, as is the rotary pulse generator 60. As roll 15 is rotated and pulses from generator 60 are recorded in master controller or computer 165, the displacement data from all four probes 56 are also recorded. Each displacement monitoring means 51-54 is polled as each counter pulse is received, so that many (e.g., 1200) readings per revolution are provided to computer 165 for each measurement location.

By taking a reading from each of the four probes (representing a particular angular position around roll 15) and entering them into the equation set forth below, the true value of the displacement of the probe of displacement monitoring means 52 can be calculated. The "true" value is the displacement value which would have been measured if the roll was rotating on a perfectly unvarying axis of rotation which passes through reference point RP (see FIG. 1). Reference point RP is the point where the reference line R intersects the measuring plane along the longitudinal axis of roll 15 at which displacement monitoring means 52 is directed. While this point is necessarily arbitrary based upon the selection of the point along which probe 56 of displacement monitor 52 is placed, it will provide a base point at which the true axis TA of roll 15 can be located. The equation set forth below is based upon data supplied by measuring means 50 and the respective lengths as illustrated in FIG. 4:

$$TD = \Delta D_B - \left[ \Delta A_H + \frac{L_B}{L_T} \times (\Delta A_T - \Delta A_H) \right] - \Delta L_A \times \tan \alpha$$

TD = True Displacement Measured by Monitor 52
$\Delta D_B$ = monitored change in transverse displacement determined by monitor 52
$\Delta A_H$ = monitored change in transverse displacement determined by monitor 51
$L_B$ = length between center of left sphere and point of probe 56 of monitor 52
$L_T$ = length between centers of spheres 49
$\Delta A_T$ = monitored change in transverse displacement determined by monitor 53
$\Delta L_A$ = monitored change in longitudinal displacement determined by monitor 54
$\alpha$ = angle of conical taper of neck portion 18

Figure 8:
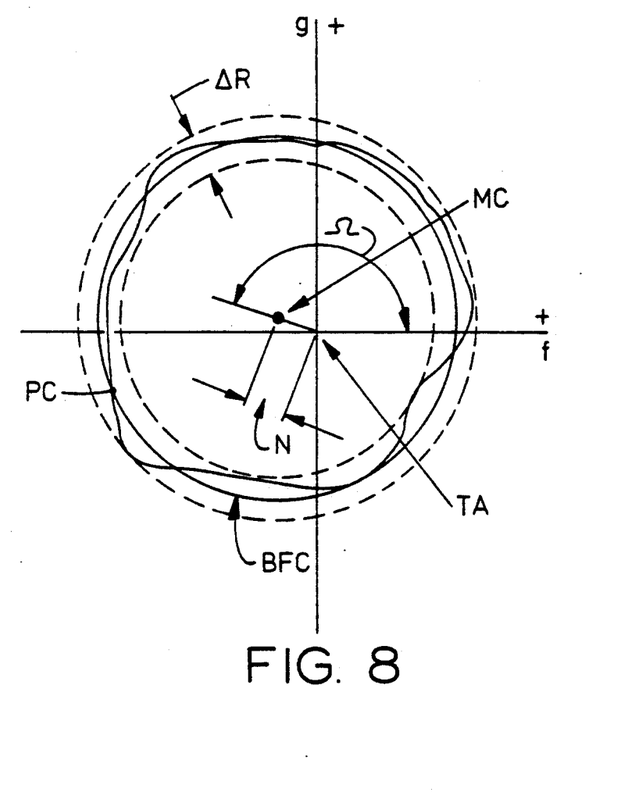
FIG. 8 is an exemplary polar plot of the outer surface of a roll at a predetermined point along the longitudinal axis, as can be produced by the apparatus and method of the present invention.

Using the coordinate points for the true values (TD), the location of the mean center (MC) at that axial location can be calculated, and the best fit mean circle BFC can be determined (See FIGS. 7 and 8). By performing this process at two different axial locations (e.g., locations 1 and 2 shown in FIG. 1), it is possible to determine the position of the roll's true axis TA in relation to the reference line R. After determining the location of true axis TA of roll 15, which will most likely not coincide with reference line R (and in fact will usually be non-parallel and non-intersecting with line R), polar plots of roll 15 referenced to true axis TA will yield the non-concentricity magnitude N (i.e., the distance from the mean center MC of the best fit mean circle measured to the true axis TA), the non-concentricity phase angle omega $\Omega$ (i.e., the angular location of the cross-section's mean center MC in relation to a predetermined timing mark on the roll) and the out-of-roundness value $\Delta R$ (See FIG. 8) of the roll at any location along the axial length of the roll.

As shown in FIG. 8, the polar coordinate plot PC is drawn indicating the profile of an outer surface at a particular point along the longitudinal axis of roll 15. The outer dotted circle is the smallest circumscribed circle which is concentric to the best fit mean circle BFC and which fully contains the polar plot PC, while the inner dotted circle is the largest inscribed circle that is also concentric to the outer circle and which does not overlap the polar plot PC. The difference between the radii of the two dashed circles is equal to $\Delta R$, and implies the degree of "roundness" of the roll at that point. The roundness of a roll can be determined by this process, and is defined where 100% of a polar coordinate plot of the profile lies between two concentric circles whose radii differ by an amount equal to the amount of non-roundness. The closer $\Delta R$ gets to zero, the more round the roll is at that particular longitudinal point. During machining operations, roundness of roll 15 can be monitored at various points along the outer surface 16 being machined. Feedback from this monitoring procedure can be utilized (e.g., by master controller 165) to optimize the machining process, such as by controlling the EDM erosion process, and to identify when a particularly desired roundness has been achieved.

Having shown and described the preferred embodiments of the present invention, further adaption of the roll roundness measuring and machining apparatus and process of the present invention can be accomplished by appropriate modifications by one of ordinary skill in the art without departing from the scope of present invention. Many of the potential modifications have been mentioned, and others will be apparent to those skilled in the art.

Figure 9:
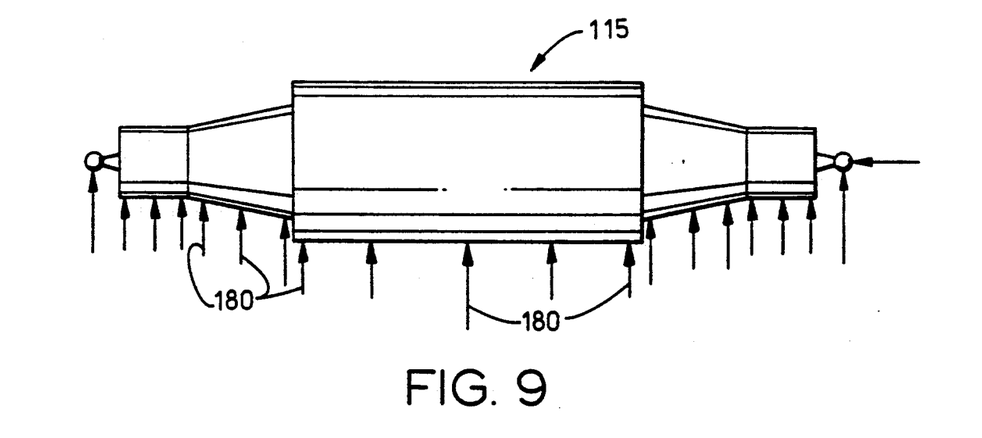
FIG. 9 is a schematic illustration of an alternate embodiment of the apparatus and method of the present invention.

For example, means 50 for measuring the roundness and concentricity of a roll might comprise displacement monitoring devices other than the laser interferometer setup described above. Costs could be reduced by using linear variable differential transformers ("LVDT'S", such as available from Sensotec, of Columbus, Ohio) as part of the gauging system. Moreover, many such LVDT's could economically be utilized to simultaneously record roundness and concentricity data at a plurality of locations along the axial length of a roll (e.g. 115), as shown in FIG. 9. If an LVDT 180 were placed at each location indicated by the arrows of FIG. 9, seventeen (17) polar plots of roll 115 could be provided simultaneously in accordance with the present invention. It is contemplated that using LVDT's could, therefore, reduce costs and facilitate determination of roundness and concentricity of a roll without having to move any of the displacement monitoring means, once initially set.

Similarly, FIG. 11 illustrates an alternate support arrangement wherein roll 215 is supported by a spaced pair of supports 228 and 229 comprising roller-type hydrostatic bearings 232. Roll 215 is also shown as being supported by its cylindrical necks 219 for machining (e.g., by EDM electrodes 289) and measuring as described above. This setup, while substantially similar to that shown in FIG. 3, helps obviate problems which can be encountered when hydrostatic bearings must support a roll surface (e.g. 219) which may have localized rough areas which could interfere with smooth operation of the bearings. Rollers 233 must be manufactured with very accurate roundness, but help to isolate the hydrostatic bearing interface from the roll so that uniform support is less dependent upon roll surface smoothness.

Accordingly, the scope of the present invention should be considered in terms of the following claims and is understood not to be limited to the details of structure and operation shown and described in the specification and drawings.

I claim:

1. An apparatus for measuring the roundness and concentricity of an outer surface of a roll having oppositely disposed ends spaced along a longitudinal axis, said apparatus comprising:
   a plurality of spaced roll supports for rotatably supporting said outer surface;
   drive means for rotating said roll about its longitudinal axis;
   means for limiting the axial movement of said roll during rotation;
   a pair of locators, one of said locators mounted adjacent each of said oppositely disposed ends of said roll, said locators establishing a reference line along said roll;
   means for measuring the roundness of said outer surface as it is rotated on said supports, said measuring means comprising a plurality of displacement monitoring means for simultaneously measuring variations in the contour of said outer surface and movement of said reference line as said roll is rotated; and
   means for determining the true axis of rotation of said roll, whereby a profile of said roll can be obtained by comparing roundness measurements taken at any point along said longitudinal axis to said true axis of rotation.

2. The apparatus of claim 1, wherein said means for measuring the roundness of said outer surface comprises a laser beam and a plurality of beam reflector assemblies to simultaneously monitor displacement of said roll at a predetermined point along said longitudinal axis and movement of said reference line during rotation of said roll.

3. The apparatus of claim 1, wherein said locators each comprise an at least partially spherical member of predetermined roundness mounted adjacent an end of said roll.

4. The apparatus of claim 1, wherein said means for limiting longitudinal movement of said roll during rotation comprises an axial strut situated adjacent one end of said roll.

5. The apparatus of claim 4, wherein one or more of said roll supports are oriented such that said roll tends to migrate toward said strut when rotated.

6. The apparatus of claim 1, wherein said supports comprise hydrostatic bearing structures.

7. The apparatus of claim 1, wherein said means for determining the true axis of rotation of said roll comprises means for automatically calculating the mean center of said outer surface at a pair of spaced apart points along the longitudinal axis of said roll corrected for radial runout of said reference line as said roll is rotated.

8. The apparatus of claim 1, further comprising feedback means for periodically measuring the roundness and concentricity of said roll as it is rotated on said supports for machining in order to monitor the changing roundness and concentricity of said outer surface as it is machined 9. The apparatus of claim 1, wherein said means for measuring the roundness of the outer surface comprises a plurality of linear variable differential transformers to simultaneously monitor displacement of said roll at a plurality of points along said longitudinal axis, and movement of said reference line during rotation of the roll 10. An apparatus for precisely machining the outer surface of a roll having oppositely disposed ends spaced along a longitudinal axis and for selectively measuring the roundness and concentricity of said outer surface, said apparatus comprising
    a plurality of spaced roll supports for rotatably supporting said outer surface;
    drive means for rotating said roll about its longitudinal axis;
    means for limiting the axial movement of said roll during rotation;
    means for machining said outer surface as it is rotated on said supports, said supports and machining means providing a centerless machining arrangement;
    a pair of locators, one of said locators mounted adjacent each of said oppositely disposed ends of said roll, said locators establishing a reference line along said roll;
    means for measuring the roundness of said outer surface as it is rotated within said supports, said measuring means comprising a plurality of displacement monitoring means for simultaneously measuring variations in the contour of said outer surface and movement of said reference line as said roll is rotated;
    means for determining the true axis of rotation of said roll, whereby a profile of said roll can be obtained by comparing roundness measurements taken at any point along said longitudinal axis to said true axis of rotation; and
    feedback means for periodically monitoring the changing roundness and concentricity of said other surface as it is machined.

11. The apparatus of claim 10, wherein said machining means comprises an electric discharge machining device.

12. The apparatus of claim 10, wherein said feedback means comprises a controller which interfaces with said machining means to selectively adjust machining parameters according to roundness and concentricity measurements obtained.

13. The apparatus of claim 10, wherein said locators each comprise an at least partially spherical member of predetermined roundness mounted adjacent an end of said roll.

14. The apparatus of claim 10, wherein said supports comprise hydrostatic bearing structures.

15. The apparatus of claim 10, wherein said means for determining the true axis of rotation of said roll comprises means for automatically calculating the mean center of said outer surface at a pair of spaced apart points along the longitudinal axis of said roll corrected for radial runout of said reference line as said roll is rotated.

16. The apparatus of claim 10, wherein said means for measuring the roundness of the outer surface comprises a plurality of linear variable differential transformers to simultaneously monitor displacement of said roll at a plurality of points along said longitudinal axis, and movement of said reference line during rotation of the roll.

17. A process for accurately measuring the roundness and concentricity of a roll having oppositely disposed ends spaced along a longitudinal axis and an outer surface with a relatively large outer diameter, said process comprising the steps of:

- rotatably supporting said outer surface of said roll on a plurality of spaced roll supports;
- mounting a pair of locators adjacent said opposite ends of said roll and determining a reference line of rotation of said roll between said locators;
- limiting axial movement of said roll along said longitudinal axis during rotation of said roll on said supports;
- measuring the roundness of said outer surface as it is rotated on said supports, said measuring means comprising a plurality of displacement monitoring means for simultaneously measuring variations in the contour of said outer surface and movement of said reference line as said roll is rotated;
- determining the true axis of rotation of said roll by calculating the mean center of said outer surface at a pair of spaced apart points along the longitudinal axis of said roll corrected for movement of said reference line as said roll is rotated; and
- obtaining a profile of said roll at any particular point along said longitudinal axis by comparing roundness measurements taken at such point to said true axis of rotation.

18. The process of claim 17, further comprising the step of machining said roll with a machining device as it is rotated on said supports to improve its roundness.

19. The process of claim 18, wherein said machining step comprises the application of an electric discharge machining process to said outer surface.

20. The process of claim 19, wherein said supports and the electric discharge machining device provide a centerless machining arrangement.

21. A process for precisely machining a roll having oppositely disposed ends spaced along a longitudinal axis and an outer surface having a relatively large outer diameter and for accurately measuring the roundness and concentricity of said roll, said process comprising the steps of:

- rotatably supporting the outer surface of a roll on a plurality of spaced roll supports, said supports situated to support said roll for centerless machining;
- mounting a pair of locators adjacent said opposite ends of said roll and determining a reference line of rotation of said roll between said locators;
- limiting axial movement of said roll along said longitudinal axis during rotation of said roll on said supports;
- measuring the roundness of said outer surface as it is rotated within said supports utilizing a plurality of displacement monitoring means for simultaneously measuring variations in the contour of said outer surface and movement of said reference line as said roll is rotated;
- determining the true axis of rotation of said roll by calculating the mean center of said outer surface at a pair of spaced apart points along the longitudinal axis of said roll corrected for movement of said reference line as said roll is rotated;
- obtaining a profile of said roll at any particular point along said longitudinal axis by comparing roundness measurements taken at such point to said true axis of rotation; and
- machining said outer surface of said roll as it is rotated on said supports.

22. The process of claim 21, wherein said step of machining said outer surface comprises application of an electric discharge machining process.

* * * * *